June 15, 1937.  A. B. FULLER  2,083,646
MOTOR DRIVE FOR MOTION PICTURE CAMERAS
Filed July 3, 1934  2 Sheets-Sheet 1
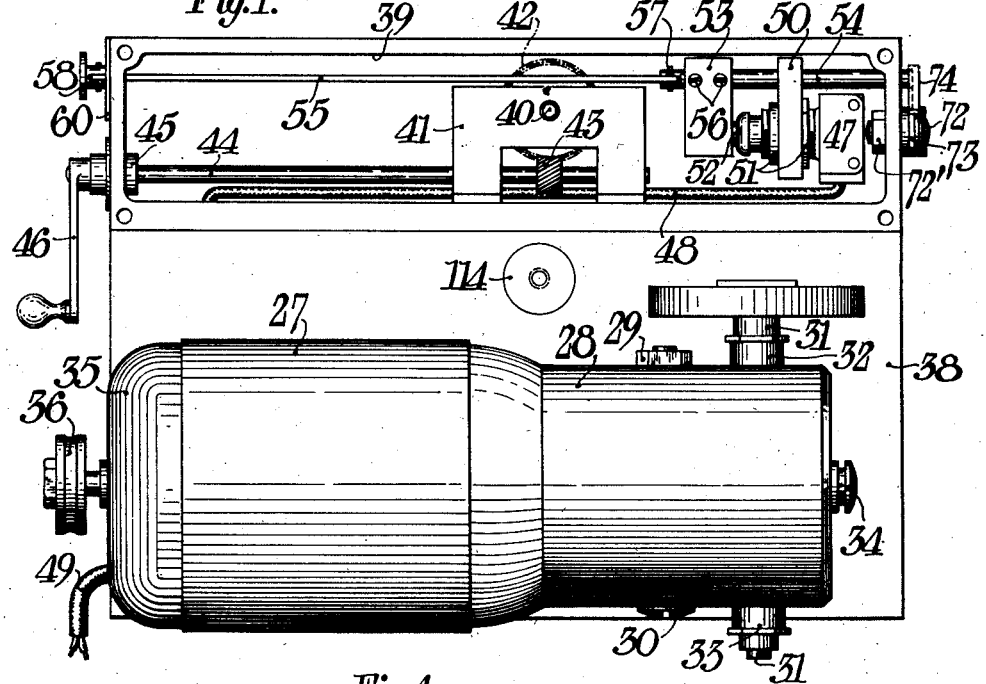
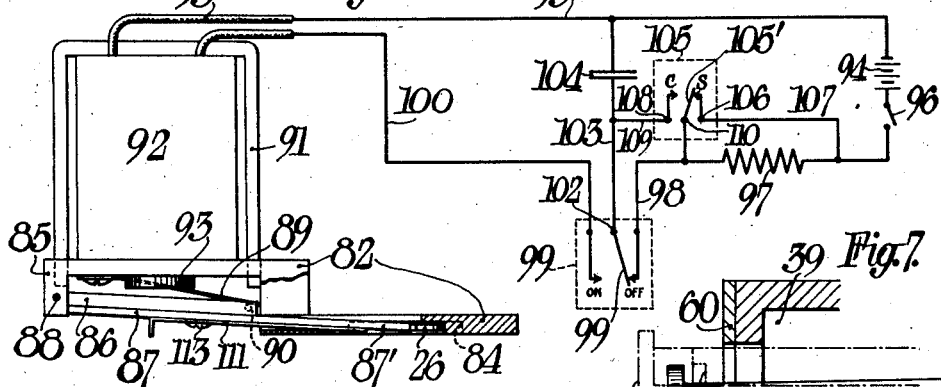
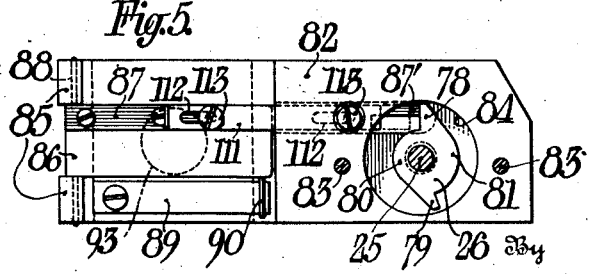
Inventor:
Albert B. Fuller, June 15, 1937.    A. B. FULLER    2,083,646
MOTOR DRIVE FOR MOTION PICTURE CAMERAS
Filed July 3, 1934    2 Sheets-Sheet 2
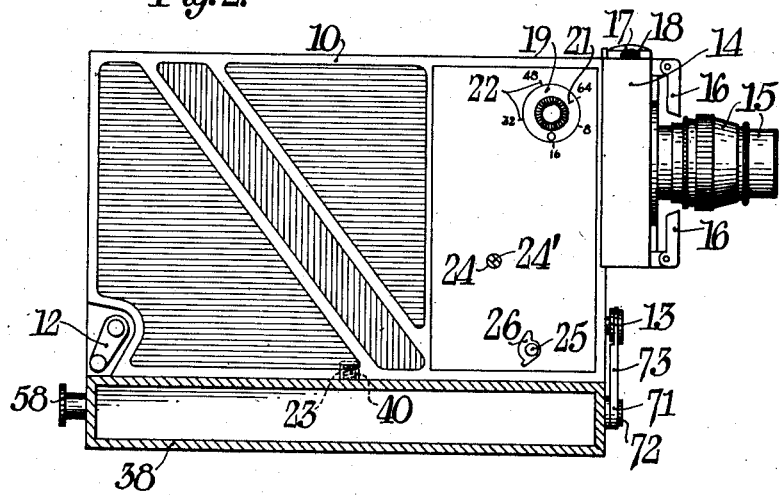
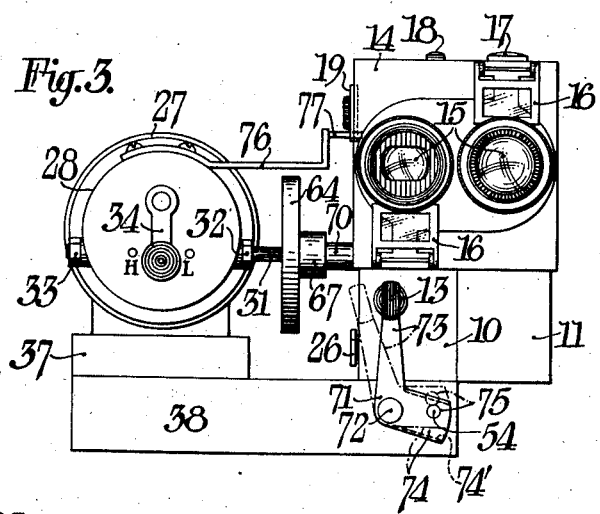
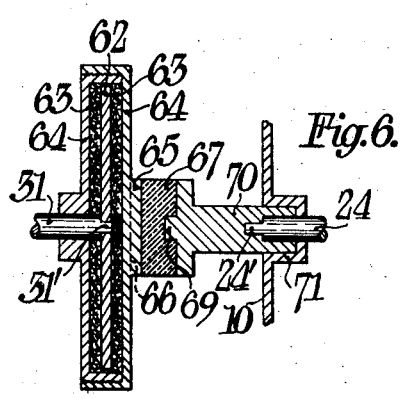
Inventor:
Albert B. Fuller, Patented June 15, 1937

2,083,646

UNITED STATES PATENT OFFICE 2,083,646

MOTOR DRIVE FOR MOTION PICTURE CAMERAS

Albert B. Fuller, Rochester, N. Y., assignor, by mesne assignments, to Eastman Kodak Company, Jersey City, N. J., a corporation of New Jersey Application July 3, 1934, Serial No. 733,600

10 Claims. (Cl. 88—17)

The present invention relates to a motor drive for motion picture apparatus and more particularly to a motor drive for motion picture cameras.

The ordinary spring motor drive found in many amateur motion picture cameras is subject to several limitations. Principally because of limitations in space and weight, the spring motors are capable of only operating the camera for exposure of comparatively short lengths of film. The mechanical governors generally employed in spring driven cameras are not susceptible to delicate speed adjustment whereas the combined arrangement of an electric governor and reduction gearing permits accurate speed adjustments over a wide range of camera speeds. Furthermore, the use of an electric motor drive for a camera introduces a simpler arrangement for remote control of the camera. One skilled in the art will readily recognize many other advantages obtained by the use of an electric motor drive for a motion picture camera.

With the introduction of a prime mover for the camera, such as an electric motor, the dangers of damage or excessive wear in the camera are also introduced.

The primary object of the present invention is the provision of a motor drive for a motion picture camera, which motor drive includes interlocking arrangements to prevent proper location and operation of the camera unless certain adjustments on the camera have been made and includes an electro-magnetic arrangement for single picture control of the camera.

Another object of the invention is the provision in a motor drive of an interlocking means which co-operates with the camera release and which prevents proper location of the camera unless the camera release has been moved to running position.

A further object of the invention is the provision of an abutment on the motor drive, which abutment will engage the speed dial of the camera to prevent attachment thereof unless said speed dial has been adjusted to a predetermined setting.

Still another object of the invention is the provision of a tendency drive for the camera and of a single picture release which may be remotely controlled and which may be operated to take time exposures with the camera.

Other and further objects of the invention will be suggested to those skilled in the art by the description which follows.

To these and other ends, the invention consists of certain parts and combinations of parts all to be hereinafter described; the novel features being pointed out in the appended claims.

Reference is hereby made to the accompanying drawings wherein similar reference characters designate similar elements and wherein:

Fig. 1 is a plan view of the motor drive having an interlocking means according to the invention.

Fig. 2 is a side elevation of a motion picture camera attached to the motor drive base which is shown in section.

Fig. 3 is a front elevation of the motor drive with the camera attached thereto.

Fig. 4 is a plan view, partially in section, of the single picture release mechanism and a diagrammatical illustration of the electrical control circuit.

Fig. 5 is a side view of the single picture release mechanism.

Fig. 6 is a cross-section of the tendency drive which is connected between the motor and camera.

Fig. 7 is a fragmentary section illustrating the co-operating parts of the base and an operating member which may effect locking of the latter.

The motor drive of the present invention has been illustrated in connection with a commercial type of camera which has many refinements. It is to be understood, however, that the motor drive may be employed to equal advantage with any type of motion picture apparatus or any type of motion picture camera.

In the illustrated embodiment of the invention, the camera has a body portion 10 and includes a film magazine 11. A locking arm 12 may operate a latching mechanism to fasten film magazine 11 onto camera body portion 10 in any suitable manner such as that described in the co-pending application of Otto Wittel, Serial #626,-918, filed July 30, 1932 for a Control arrangement for a motion picture camera. As was indicated in said application, the camera is provided with a releasing mechanism for controlling operation of the film drive and includes a release member 13 which extends through the front wall of camera body portion 10. The release member 13 is normally moved to the extended position to stop the camera and may be depressed to running position for operation of the film drive.

The camera is equipped with a lens turret 14 upon which is mounted a pair of objectives 15 and a pair of finder elements 16. The lens turret 14 is provided with a reflex finder which includes a viewing lens 17 and an operating pin 18 and which is more fully described in another co-pending application of Otto Wittel, Serial

625,986, filed July 29, 1932 for a Reflex finder for motion picture cameras.

The operating speed of the camera may be varied by adjustment of a speed dial 19 which is rotatably mounted in the side wall of body portion 10, which is provided with an opening 20, and which has an index mark 21 for registering with calibrated graduations 22 on body portion 10. The construction of such elements for controlling the speed of camera operation is well known but is more comprehensively disclosed and described in the co-pending application of Joseph Stoiber, Serial #620,189, filed June 30, 1932 for a Centrifugal governor for a motion picture camera.

The camera body portion 10 is provided in a well known manner with a bushing 23 which is internally threaded. The camera body portion 10 also includes a driven shaft 24 and an operating shaft 25 which carries a cam 26 to be described in more detail later on.

The motive power is supplied by a prime mover of suitable characteristics and is preferably provided by an electric motor 27. A reduction gear arrangement of well recognized construction is mounted within the housing 28 and is connected to a shaft (not shown) of the electric motor 27. Part of the reduction gearing is supported between bushings 29 and 30 on the exterior of housing 28 and part by a shaft 31 which is journaled in bushings 32 and 33 on the exterior of housing 28. A gear shift lever 34 is adapted in the usual way to change the gear ratios within housing 28 and is movable from a neutral position shown in Fig. 3 either to a high position designated by a symbol H or to a low position designated by the letter L.

An electrical governor of commercial design is mounted on the other end of electric motor 27 and within the cap 35. A knob 36 is threaded into cap 35 and is rotatable to various positions corresponding to different speed settings of the governor for the motor. The electric motor and governor are of a construction which is and has been available in the commercial markets for many years so that more detailed description thereof is not considered necessary.

The electric motor 27 and reduction gear housing 28 are mounted upon a support 37 which is in turn fastened to a base 38.

The base 38 is provided with a chamber 39 within which one element of a fastening means is located and within which a control means is mounted.

The element of the fastening means includes a threaded stud 40 which is mounted in a bracket 41 for rotation about a vertical axis, is adapted to engage the internal bushing 23 in the camera body portion 10 and carries a gear 42. Said element of the fastening means may be rotated by a gear 43 which is mounted on a horizontal shaft 44. Said shaft 44 is journaled in the bracket 41 and in a bushing 45 and is provided with a crank 46. Thus, the fastening means is composed of two parts, one the internally threaded bushing 23 and the other the threaded stud 40 which may be operated by the shaft 44 and crank 46. Of course, the parts of the fastening means can only engage each other or the stud 40 can only be threaded into bushing 23 when these parts are in axial alignment. The control means within chamber 39 of base 38 includes a normally open switch 47 and a switch operating member. The normally open switch 47 is connected by a wire 48 to the electric motor 27 and to a source of electrical energy through a wire 49 so that the motor is only energized when switch 47 is closed. The switch 47 is mounted upon a bracket 50 by means of lock nuts 51 and has a plunger 52 which is normally moved to extended position or toward the left, as seen from Fig. 1. The operating member of the control means includes a block 53, a projection 54 and a lever 55. The projection 54 is slidably mounted in bracket 50 and in the forward wall of base 38. The block 53 is fastened to projection 54 by a pair of set screws 56. The lever 55 is pivotally mounted at one end to the projection 54 by a pin 57 and at the other end carries a button 58.

The operating member of the control means is normally held by the plunger 52 of switch 47 in a retracted position with the button 58 and lever 55 in the position shown by dotted lines in Fig. 7. Lever 55 extends through an opening 59 in the rear wall of base 38 and through an apertured plate 60 attached to said rear wall adjacent and partially overlapping the opening 59. The lever 55 is provided with a notch 61 which may engage the overlapping portion of plate 60.

Under normal conditions the switch 47 of the control means is open and the electric motor 27 is still. In this position the block 53, lever 55, and button 58 are biased to the left end position of Fig. 1 by the plunger 52 of normally open switch 47. By pressing on button 58, the lever 55 and block 53 are moved to depress the plunger 52 and to close switch 47. Upon closure of switch 47 the electric motor 27 is energized and operates. The movement of the operating member to running position and to close switch 47 also moves projection 54 within bracket 50 and the front wall of base 38 to extend beyond said base 38. If it is desired to latch the operating member in running position, the button 58 may be pressed downwardly so that notch 61 engages the overlapping portion of aperture plate 60 and to hold the plunger 52 in closed position. This locking or latching of the end of lever 55 in running position is best illustrated in Fig. 7.

The motor 27 may be directly connected through the reduction gearing to the driven shaft 24 of the camera or may be connected thereto through a friction drive. The shaft 31 extending from the housing 28 of the reduction gearing has a flat end 31', see Fig. 6, which engages a similarly shaped aperture in a plate 62. A pair of friction disks 63 are held against each side of plate 62 by a pair of cup shaped members 64. The cup shaped members 64 are threaded together and may be turned with respect to each other either to increase or to decrease the frictional engagement between the friction disks 63 and plate 62. A key 65 may be formed with one of members 64 and is adapted to engage a key-way 66 of coupling 67. The coupling 67 has a second key-way 68 at right angles to key-way 66 and adapted to engage a key 69 of a bushing 70. The other end of bushing 70 extends into a recess 71 of camera body portion 10 and is formed to engage the flattened end 24' of driven shaft 24.

If the camera is mounted upon the base 38 and with the shaft 31 connected through the friction drive, coupling 67, and bushing 70 to the driven shaft 24, then upon closure of switch 47 the camera may be operated by the electric motor 27. Such operation of the camera by motor 27 can only take place if the release member 13 is in running position. Failure to move said release member 13 to running position before starting the motor 27 will result in relative movement between plate 62 and friction disks 63. It is often times desirable and within the contemplation of the invention to eliminate the friction drive and to connect shaft 31 for direct drive of camera shaft 24. With such a direct drive and energization of motor 27 without previous location of release member 13 in running position, the motor 27 and/or operating parts of the camera will be subjected to severe strain. Therefore, an interlocking arrangement has been provided for preventing the proper location of the camera upon the base 38 and the closure of switch 47 unless the release member 13 of the camera has first been moved to running position. Such an interlocking arrangement is now to be described.

This interlocking means includes a bell crank 71 which is pivotally mounted on the base 38 by a stud 72 and a nut 72'. One arm 73 of bell crank 71 extends upwardly and is adapted to cooperate with the release member 13 of the camera. The other arm 74 of bell crank 71 is located opposite the end of projection 54, has a pair of fins 74' for engaging projection 54 and limiting the angular movement of crank 71, and is provided with an opening 75 for receiving said projection 54 under conditions to be explained. The bell crank 71 is movable within the limits of said angular movement to either of two positions, one a blocking position shown by the dot dash lines of Fig. 3 and in which the arm 74 abuts against the end projection 54 to prevent movement of the operating member and switch 47 of the control means to running position, the other an unblocking position shown by the full lines of Fig. 3 in which the opening 75 of arm 74 registers with projection 54 to permit movement of the operating member and switch 47 of the control means to running position. In blocking position of bell crank 71, the arm 73 does not engage or interfere with the release member 13. The camera may be located upon the base 38 by inter-engagement of the parts of the fastening means without movement of the release member 13 to running position. However, as just explained, the switch 47 can not be opened until the bell crank is moved to unblocking position and before this movement of bell crank 71 can be accomplished, the release member 13 must be moved to running position. The interlocking means may safeguard the camera in a somewhat different but related matter.

Assume that bell crank 71 is in unblocking position so that the switch 47 may be moved to running position and that the camera has not yet been mounted on the base. If an attempt is made to fasten the camera to the base, the parts of the fastening means and the coupling members of the driving connection cannot both be engaged unless the release member 13 of the camera is in running position. In other words, the arm 73 of bell crank 71 will interfere with the release member 13 of the camera when it is in stopped position and when the parts of the fastening means and of the driving connection are in proper alignment and engagement for attachment of the camera to the base 38.

Since the motor drive of the invention includes a governor on the motor, it is desirable that the mechanical governor usually provided in variable speed cameras be set for the highest speed. Otherwise the motor drive will operate against this mechanical governor and cause excessive wear therein. Accordingly, a blocking arrangement is provided to prevent proper attachment of the camera to the base 38 until the speed dial 19 of the camera has been set for the highest speed of operation or for some other predetermined speed. The opening 20 in speed dial 19 is located in a definite relation to said predetermined speed or said highest speed. An abutment is located on the motor drive and specifically consists of a bracket 76 attached to housing 28 of the reduction gear and supporting a pin 77 which may enter the opening 20 of the speed dial 19.

If an attempt is made to align the parts of the fastening means and to align and engage the elements of the driving connection without first turning speed dial 19 to the predetermined position, then the abutment or pin 77 will not enter the opening 20 in speed dial 19 and the bushing 23 and threaded stud 40 or the coupling 67 and bushing 70 cannot be aligned for proper engagement. However, if the speed dial 19 is turned to the predetermined position, then the abutment or pin 77 will enter the opening 20 and permit proper alignment and engagement of the fastening means and of the driving connections.

The uses of a well equipped camera are still further increased if said camera can be remotely controlled and can be controlled to expose one frame at a time. It is also often desirable to give time exposures to the single picture and the arrangement now to be described is devoted to these ends.

The cam 26 on the operating shaft 25 of the camera has a tooth 78 and has a tooth 79. A circular portion 80 of small radius extends around one side of the cam between the teeth 78 and 79. A second circular portion 81 of larger radius extends around the other side of cam 26 from tooth 79 to tooth 78.

The remote control or single picture release of the invention also includes a stop member which is normally in engagement with one tooth 78 or 79 of the cam 26. A support 82 may be fastened to the camera body portion 10 adjacent the operating shaft 25 and the cam 26 by means of a pair of screws 83. The support 82 is provided with a circular recess 84 within which the cam 26 may rotate. The support 82 has a pair of bearings 85 between which an armature 86 and an arm 87 are rotatably supported by a hinged pin 88. A resilient means includes a spring 89 mounted on support 82 and engaging a pin 90 on the armature 86. A bracket 91 extends from support 82 and supports an electro-magnet 92 which has a core 93 and which is energized in a manner later to be described.

The resilient means normally moves armature 86 away from core 93 and the end 87' of arm 87 into engagement either with tooth 78 or tooth 79. Upon energization of electro-magnet 92, the core 93 attracts armature 86 and moves the end 87' of arm 87 out of engagement with the teeth of cam 26 against the action of spring 89.

The circuit for energizing electro-magnet 92 is diagrammatically illustrated in Fig. 4. The source of electrical energy is a battery 94 which is preferably of the type generally used for flash lights. One side of battery 94 is connected directly by a wire 95 to one side of the electromagnet 92. The other side of battery 94 is connected through a switch 96 to one end of a resistor 97. The other end of resistor 97 is connected by a lead 98 to one side of a single pole double throw switch 99. Switch 99 may be of the push-button type and is preferably held normally in the position designated "off" shown in Fig. 4. The other side of switch 99, which corresponds to the "on" position thereof, is connected by a lead 100 to the other side of electro-magnet 92. The center pole 102 of switch 99 is connected by a lead 103 to one side of a fixed condenser 104, the other side of condenser 104 being connected to the wire 95 between battery 94 and electro-magnet 92.

A second single pole double throw switch 105 has an outside pole 106 connected by a wire 107 to a point between the battery 94 and resistor 97 while the other outside pole 108 of switch 105 is connected by a wire 109 to the lead 103 between the fixed condenser 104 and the center pole 102 of switch 99. The center pole 110 of switch 105 is connected to the lead 98 between the resistor 97 and one side of switch 99. While the switch arm 99' of switch 99 is normally held in the "off" position the switch arm 105' of switch 105 may remain either in contact with the outside pole 106 designated as position "S" or in contact with outside pole 108 which position is designated as "C".

The operation of the electrical circuit just described is as follows: Upon closure of switch 96 and with switch arms 99' and 105' in the positions shown in Fig. 4, the condenser 104 is charged by the battery 94 through the outside pole 106 of switch 105 and through the "off" position of switch 99, the resistor 97 being short-circuited by the wire 107. The leads to switch 99 may be of any length to permit remote location thereof and upon movement of switch arm 99' to the "on" position, the condenser 104 is, connected across the electro-magnet 92. The discharge of condenser 104 temporarily energizes electro-magnet 92 and causes attraction of armature 86 and arm 87.

Upon discharge of condenser 104, the resilient means or spring 89 predominates and returns the arm 87 to engaging position. The capacity of condenser 104 is selected so that the arm 87 will be returned by spring 89 for engagement of end 87' of arm 87 with the next tooth on cam 26. For instance, with reference to Fig. 5, the arm end 87' is disengaged from tooth 78 upon energization of electro-magnet 92 by the condenser 104. The condenser discharge is only sufficient to attract armature 86 for a short interval whereupon the end 87' of arm 87 is immediately returned for engagement with the tooth 79. The tooth 79 is so located on cam 26 that the shutter of the camera remains in open position during engagement of tooth 79 with arm 87. The switch arm 99' returns to normal position and the condenser 104 is again charged. Upon the next operation of switch arm 99', electro-magnet 92 is again temporarily energized by condenser 104 to disengage arm 87 and tooth 79, arm 87 again being immediately returned for engagement with tooth 78.

The single picture release of the invention is also adapted to permit a complete cycle of operation of the camera. For this purpose a guide 111 is provided with elongated slots 112 and is slidably mounted upon arm 87 by a pair of bolts 113. With guide 111 in the position shown in Fig. 5, the operation of the release mechanism will be that just described. However, when guide 111 is slid into the position indicated by dot dash lines in Fig. 5, the operation of the release is modified. With the end 87' of arm 87 blocking tooth 78 of cam 26 and temporary energization of electro-magnet 92 by condenser 104 upon closure of switch 99, the cam 26 will be turned by the motor 27 through the friction drive. The electro-magnet 92 is only temporarily or momentarily energized by condenser 104 so that spring 89 endeavors to return arm 87 for engagement with tooth 79. However, guide 111 now rides upon the circular portion 81 of larger radius of cam 26 and prevents the return of arm 87 by spring 89 until after tooth 79 has passed the arm end 87'. The circular portion 80 of smaller radius will permit the return of arm end 87' and guide 111 for engagement with tooth 78. Thus, a single closure of switch 99 effects a complete cycle of the camera and the exposure for the usual period of a single picture.

If the camera is to be operated continuously, the switch arm 105' is moved to the position designated "C". The condenser 104 is now charged by battery 94 through resistor 97. Upon closure of switch arm 99' the condenser 104, as before, is connected across electro-magnet 92 but in addition the battery 94 is also connected across electro-magnet 92 through the resistor 97. As a result, the electro-magnet 92 is initially energized by the combined effects of battery 94 and condenser 104. This relatively large initial energization is necessary for the original attraction of armature 86 and arm 87. After the discharge of condenser 104, the electro-magnet 92 is still energized but now only to a degree corresponding to the difference in potential across battery 94 less the voltage drop across resistor 97. In this last condition, the electro-magnet 92 is energized sufficiently to hold arm 87 out of engagement with cam 26 against the action of spring 89 by the energy drawn from battery 94 and now providing sufficient energization of electro-magnet 92 which energization is much less than that necessary for the initial energization and attraction of armature 86.

The source of power for operating the camera may be supplied by the electric motor 27 through the tendency or friction drive in which the frictional engagement between plate 62 and friction disks 63 is adjusted by relative positioning of cup-shaped members 64 so that there is sufficient friction to drive the camera mechanism but also that upon blocking of cam 26 the plate 62 may slip between said friction disks 63. On the other hand, said single picture or remote control release will operate with equal facility when the camera is being operated by the usual spring motor in which case blocking of cam 26 stops said spring motor.

To facilitate the attachment of the motor drive assembly, a threaded bushing 114 is provided in base 38.

Since many variations and modifications of the motor drive just described are possible without departing from the scope of the invention, the present disclosure is to be construed in an illustrative and not in a limiting sense.

Having now particularly described my invention what I desire to secure by Letters Patent of the United States and what I claim is:—

1. The combination with a motion picture apparatus having a driven clutch member, a fastening member, and a control member movable to a predetermined operating position and for controlling the operation of said apparatus, of a unit comprising a prime mover having a driving clutch member for engaging the driven clutch member of said apparatus, comprising a fastening member adapted upon being placed in axial alignment with the fastening member in said apparatus to engage said fastening member and fixedly to secure said apparatus to said unit, and comprising a blocking means on said unit, arranged to co-operate with said control member only during said predetermined operating position thereof and for permitting simultaneous engagement of said clutch members and said fastening members on the apparatus and unit but adapted when said control member is not in said predetermined operating position to abut said control member and prevent the simultaneous engagement of said clutch members and said fastening members.

2. In a driving unit for a motion picture apparatus which has a release member movable to a running position for operation of the apparatus and to an engaging position to stop said apparatus, the combination with a prime mover adapted to be connected to said apparatus for operation thereof, and a control means for controlling the operation of said prime mover and movable to a running position for operation of said prime mover, of an interlocking means including a portion movable into a blocking position to abut said control means and to prevent movement of said control means to said running position, and including a second portion movable with said first mentioned portion and located to be blocked by said release member when said release member is in engaging position with respect to said apparatus and to maintain said first mentioned portion in blocking position with respect to said control means.

3. In a driving unit for a motion picture apparatus which has a release member movable to a running position for operation of the apparatus and to an engaging position to stop said apparatus, the combination with a prime mover adapted to be connected to said apparatus for operation thereof, and a control means for controlling the operation of said prime mover and movable to a running position for operation of said prime mover, of an interlocking means including a portion movable into an unblocking position to permit free movement of said control means to and from said running position, and including a second portion movable with said first mentioned portion and located to block said release member in running position when said first mentioned portion is in unblocking position.

4. In a driving unit for a motion picture apparatus which has a release member movable to a running position for operation of the apparatus and to an engaging position to stop said apparatus, the combination with a prime mover adapted to be connected to said apparatus for operation thereof, and a control means for controlling the operation of said prime mover and movable to a running position for operation of said prime mover, of an interlocking means including a portion movable into a blocking position to abut said control means and into an unblocking position to permit free movement of said control means, and including a second portion movable with said first mentioned portion and located to be blocked by said release member when said release member is in engaging position and located to block said release member in running position when said first mentioned member is in unblocking position.

5. In a motor drive for a motion picture apparatus, the combination with a base for supporting said apparatus, an electric motor having an energizing circuit and adapted to drive said apparatus, and a control means on said base and including a normally open switch in said circuit of the electric motor, and including a switch operating member for closing said switch and having a projection which moves with said operating member, of an interlocking means mounted on said base for movement to a blocking position and to an unblocking position, having a portion which is provided with an opening to receive said projection in unblocking position of the interlocking means when said operating member is moved to close said switch and which is adapted in blocking position of the interlocking means to abut said projection and prevent closure of said switch, and having another portion movable with the first mentioned portion and which is adapted to abut a control member on said apparatus unless said control member of the apparatus is in a definite operating position.

6. In a motor drive for a motion picture apparatus, the combination with a base for supporting said apparatus, an electric motor having an energizing circuit and adapted to drive said apparatus, and a control means on said base and including a normally open switch in said circuit of the electric motor, and including a switch operating member slidably mounted in said base and for closing said switch and having a projection which slides with said operating member, of an interlocking means mounted on said base for movement to a blocking position and to an unblocking position, having a portion which is provided with an opening to receive said projection in unblocking position of the interlocking means when said operating member is moved to close said switch and which is adapted in blocking position of the interlocking means to abut said projection and prevent closure of said switch, and having another portion movable with the first mentioned portion and which is adapted to abut a control member on said apparatus unless said control member of the apparatus is in a definite operating position.

7. In a motor drive for a motion picture apparatus, the combination with a base for supporting said apparatus, and an electric motor having an energizing circuit and adapted to drive said apparatus, a switch in said circuit of the motor and including a plunger which is normally maintained in an extended position with said switch in open position, and an operating member mounted in said base and movable to a running position and to abut against said plunger for closure of said switch, the normal resilient action of said plunger holding said operating member out of said running position, of cooperating parts on said operating member and on said base and adapted for engagement upon movement of the operating member to running position.

8. In a motor drive for a motion picture apparatus, the combination with a base for supporting said apparatus, an electric motor having an energizing circuit and adapted to drive said apparatus, a switch in said circuit of the motor and including a plunger which is normally maintained in an extended position with said switch in open position, and an operating member which is movably mounted in said base for movement to a running position and to abut against said plunger for closure of said switch, and a projection connected to and movable with said operating member, of an interlocking means pivotally mounted on said base, having a portion adapted in one position to abut said projection and prevent movement of said operating member to running position, said portion being provided with an opening adapted in another position of the interlocking means to receive said projection and permit movement of said operating member to running position.

9. In a device of the character described, the combination with a motion picture apparatus, a speed control means on said apparatus including a member movable to several positions for various speeds of apparatus operation, said member being provided with an opening which has a definite position with respect to a predetermined speed setting, of a base, a prime mover mounted upon said base, a fastening means including parts on said base and said apparatus adapted upon engagement to hold said apparatus on said base, and an abutment located on said base, adapted to fit into the opening of said member of the speed control means and permit inter-engagement of the parts of said fastening means when said member is set at said predetermined speed and adapted to abut against said member and prevent inter-engagement of the parts of said fastening means when said member is not set at said predetermined speed.

10. In a device of the character described, the combination with a motion picture camera, a speed control means on said apparatus including a dial which is rotatable to several positions for various speeds and which is provided with an opening in definite position with respect to the dial setting for the highest speed, of a base, a fastening means including engageable parts on the camera and on the base and for attaching said camera to said base, and a pin member located on said base, adapted to fit into the opening of the speed dial and permit engagement of the parts of said fastening means when said speed dial has a setting corresponding to the highest camera speed, and adapted to abut against said member and prevent engagement of said fastening means when the speed dial is not set for said highest speed.

ALBERT B. FULLER.